(12) United States Patent
Pang et al.

(10) Patent No.: US 7,239,656 B2
(45) Date of Patent: *Jul. 3, 2007

(54) CLOSED-LOOP PURGING SYSTEM FOR LASER

(75) Inventors: Yang Pang, San Jose, CA (US); Matthew Perry Philpott, Burlingame, CA (US)

(73) Assignee: Coherent, Inc., Santa Clara, CA (US)

(*) Notice: Subject to any disclaimer, the term of this patent is extended or adjusted under 35 U.S.C. 154(b) by 418 days.

This patent is subject to a terminal disclaimer.

(21) Appl. No.: 10/917,170

(22) Filed: Aug. 12, 2004

(65) Prior Publication Data

US 2005/0013329 A1 Jan. 20, 2005

Related U.S. Application Data

(63) Continuation of application No. 09/901,857, filed on Jul. 9, 2001, now Pat. No. 6,798,813.

(51) Int. Cl.
*H01S 3/20* (2006.01)
*H01S 3/22* (2006.01)
*H01S 3/098* (2006.01)

(52) U.S. Cl. .................... 372/59; 372/18; 372/53; 372/55

(58) Field of Classification Search ............ 372/59, 372/18
See application file for complete search history.

(56) References Cited

U.S. PATENT DOCUMENTS

| | | | | |
|---|---|---|---|---|
| 3,393,032 A | 7/1968 | Crisler et al. | ............ | 350/67 |
| 3,751,225 A | 8/1973 | Karlson | ............ | 21/91 |
| 3,789,320 A | 1/1974 | Hepburn | ............ | 372/58 |
| 3,810,044 A | 5/1974 | Woodbury et al. | ............ | 331/94.5 |
| 4,229,709 A | 10/1980 | McMahan | ............ | 331/94.5 T |
| 4,316,157 A | 2/1982 | Dosi et al. | ............ | 372/59 |
| 4,364,015 A | 12/1982 | Drake et al. | ............ | 372/53 |
| 4,610,014 A | 9/1986 | Martinen et al. | ............ | 372/59 |
| 4,977,566 A | 12/1990 | Herbst et al. | ............ | 372/33 |
| 5,216,689 A | 6/1993 | Gardner et al. | ............ | 372/87 |
| 5,430,303 A | 7/1995 | Matsumoto et al. | ............ | 250/492.2 |
| 5,771,260 A | 6/1998 | Elliott et al. | ............ | 372/109 |
| 5,876,487 A | 3/1999 | Dahlgren et al. | ............ | 96/13 |
| 6,036,321 A | 3/2000 | Wright et al. | ............ | 359/513 |
| 6,214,303 B1 | 4/2001 | Hoke et al. | ............ | 423/210 |
| 6,243,406 B1 | 6/2001 | Heist et al. | ............ | 372/59 |
| 6,327,290 B1 | 12/2001 | Govorkov et al. | ............ | 372/61 |
| 6,399,916 B1 | 6/2002 | Gortler et al. | ............ | 219/121.84 |
| 6,419,487 B1 | 7/2002 | Tunnell, Jr. et al. | ............ | 433/98 |
| 6,428,608 B1 | 8/2002 | Shah et al. | ............ | 95/123 |
| 6,504,860 B2 | 1/2003 | Newman et al. | ............ | 372/59 |
| 6,798,813 B2 * | 9/2004 | Pang et al. | ............ | 372/59 |

* cited by examiner

FOREIGN PATENT DOCUMENTS

DE 30 03 793 A1 2/1980
DE 39 38 592 A1 11/1989

*Primary Examiner*—Armando Rodriguez
(74) *Attorney, Agent, or Firm*—Stallman & Pollock LLP

(57) ABSTRACT

A method of minimizing contamination of optical components of a laser resonator is disclosed. The resonator components are located in an enclosure, which may contain contaminants including water vapor and organic favor released by the optical components, mounts of the optical components, or the enclosure itself. The enclosure may also contain suspended particulate matter. In order to reduce the level of these contaminants, a purging system extracts gas from the enclosure and passes the gas through a desiccant, an organic vapor trapping material, and a particulate matter filter then returns the extracted gas to the enclosure. The purging system is particularly useful for ultrafast lasers and ultraviolet lasers where the power of the laser radiation increases the probability of destabilizing reactions between laser radiation and contaminants.

18 Claims, 3 Drawing Sheets

CLOSED-LOOP PURGING SYSTEM FOR LASER

CLAIM OF PRIORITY

This application is a continuation of U.S. patent application Ser. No. 09/901,857, filed Jul. 9, 2001 (now U.S. Pat. No. 6,798,813), entitled "CLOSED-LOOP PURGING SYSTEM FOR LASER," which is hereby incorporated herein by reference.

TECHNICAL FIELD OF THE INVENTION

The present invention relates generally hermetic sealing of lasers. The invention relates in particular to a closed-loop purging system for water vapor, organic vapor and particulate content in an enclosure surrounding an ultrafast laser resonator or an ultraviolet (UV) laser resonator.

BACKGROUND

Ultrafast lasers are generally regarded as being lasers that deliver output radiation in pulses having a duration of a few hundred femtoseconds or less. One common ultrafast laser is a Ti:sapphire laser, which can be arranged to deliver output radiation at wavelengths between about 700 nanometers (nm) and about 1000 nm. The pulses delivered often have a relatively low energy, for example, tens of millijoules (mJ) to as little as tens of nanojoules (nJ). The short pulse-duration can cause the pulses to have a very high peak power, for example, on the order of gigawatts per square centimeter ($GW/cm^2$) in certain locations in a resonator.

The very high peak powers delivered by such lasers can rapidly cause damage to optical components of the lasers, absent measures to inhibit such damage. Laser damage to optical components may be exacerbated by defects on or in optical surfaces of the components. Accordingly, it is not unusual that at least some portion of the optical components of an ultrafast laser are generated by so-called super-polishing techniques which yield surfaces having a surface smoothness of atomic dimensions, for example, about 4 Ångstrom Units (Å) root-mean-square (RMS) or less. Optical coatings for such super-polished components, reflective coatings in particular, are often deposited by ion-beam sputtering (IBS). IBS is a coating deposition method that can provide coatings having a high degree of chemical perfection and very low defect content. This minimizes absorption and scattering of radiation by the coatings. However, a super-polished, IBS-coated optical component can be as much as about five or more times more expensive than a similar component polished and coated by more conventional methods. Such additional expense can be wasted if the components are later contaminated by particulate matter, condensates, vapors, or the like.

It is not unusual in commercial laser manufacture to assemble lasers in clean-room conditions to minimize particulate deposition on optical components of the lasers. In such a case, it would be usual to place at least the optical resonator of the laser in an enclosure sufficiently sealed to minimize at least ingress of particulate contaminants, and preferably also, ingress of contaminants in gaseous or vapor form. Such an enclosure may be purged, before sealing, with filtered dry nitrogen, dry air or the like.

By implementing one or more above-discussed measures during manufacturing and assembly, an ultrafast laser may be operated for a total as long as several thousand before the performance of the laser becomes significantly diminished by laser damage to one or more optical components thereof. It is believed, however, even if an enclosure could be perfectly hermetically-sealed, damage to optical components may result from contamination of optical components by outgassing products of the optical components, adhesives and the enclosure itself. Outgassing products can be generated while the laser is operating and also while the laser is not operating.

It is believed that the most problematical of the outgassing products are organic vapors, which can be released from material such as adhesives, elastomer seals, and any plastic materials used in the construction of the enclosure. Water vapor may also be released from components of the enclosure or optics therein. The water vapor and the organic vapors can condense directly on surfaces of the optical components. The water vapor and organic vapors together or in combination can react with laser radiation while the laser is operating. Products of the reactions can also condense or be deposited on the optical surfaces. These reaction products may include particulate matter such as carbon particles or soot. Most of these reaction products, if condensed or deposited on the optical surfaces can increase the vulnerability of the optical surfaces to damage by the laser radiation. Even if reaction products were only present within the atmosphere of the enclosure this could still result in unstable operation of the laser.

BRIEF SUMMARY

The present invention is directed to a method of minimizing contamination of optical components of a laser, the components being located in a gaseous atmosphere within an enclosure. The gaseous atmosphere can contain contaminants including water vapor, organic vapor, and suspended particulate matter. These contaminants may be present at some low level, for example, hundreds of parts per billion or less, immediately after the components are placed in the enclosure. The contaminant level can increase with both operational and non-operational time of the laser.

In one aspect of the present invention, the method comprises extracting gas from the atmosphere within the enclosure. The extracted gas is passed through a first medium selected to reduce the water vapor content of the extracted gas; through a second medium selected to reduce the organic vapor content of the extracted gas; and through a filter selected to reduce the particulate matter content of the extracted gas. After the extracted gas is passed through the first and second media and the filter, it is returned to the enclosure.

The extraction and replacement cycle preferably takes place continuously during operation of the laser such that the water vapor, organic vapor, and particulate matter content of the atmosphere in the enclosure is maintained at a minimum consistent with the selection of the media and the filter.

In another aspect of the invention, apparatus for carrying out the method includes a gas conditioning arrangement including the first (a desiccant) medium, the second (a medium for trapping organic vapors) medium, and the filter for trapping particulate matter. The apparatus includes a pump, which is arranged to extract gas from the enclosure and deliver the extracted gas to the gas-conditioning arrangement. The gas conditioning arrangement is configured such that the extracted air delivered thereto by the pump passes through the desiccant medium, the organic vapor trapping medium, and the filter, and is then returned to the enclosure.

In one preferred embodiment, the apparatus further includes first and second valves. The first and second valves are arranged such that a drying gas may be circulated through the desiccant medium for regenerating the desiccant medium while preventing the drying gas from reaching the enclosure.

Maintaining a low organic vapor content in a laser resonator is particularly important if the laser resonator is an ultrafast laser resonator or a laser resonator arranged to generate ultraviolet laser radiation. The relatively high-energy of ultraviolet laser radiation, multiphoton processes in the case of ultrafast lasers, generating longer wavelength radiation can increase the probability of reactions between the laser radiation and the organic vapors or their condensates. As noted above, products of these reactions, including particulate matter, can lead to unstable operation of the laser, or accelerated damage to optical components of the laser resonator.

DETAILED DESCRIPTION

Figure 1:
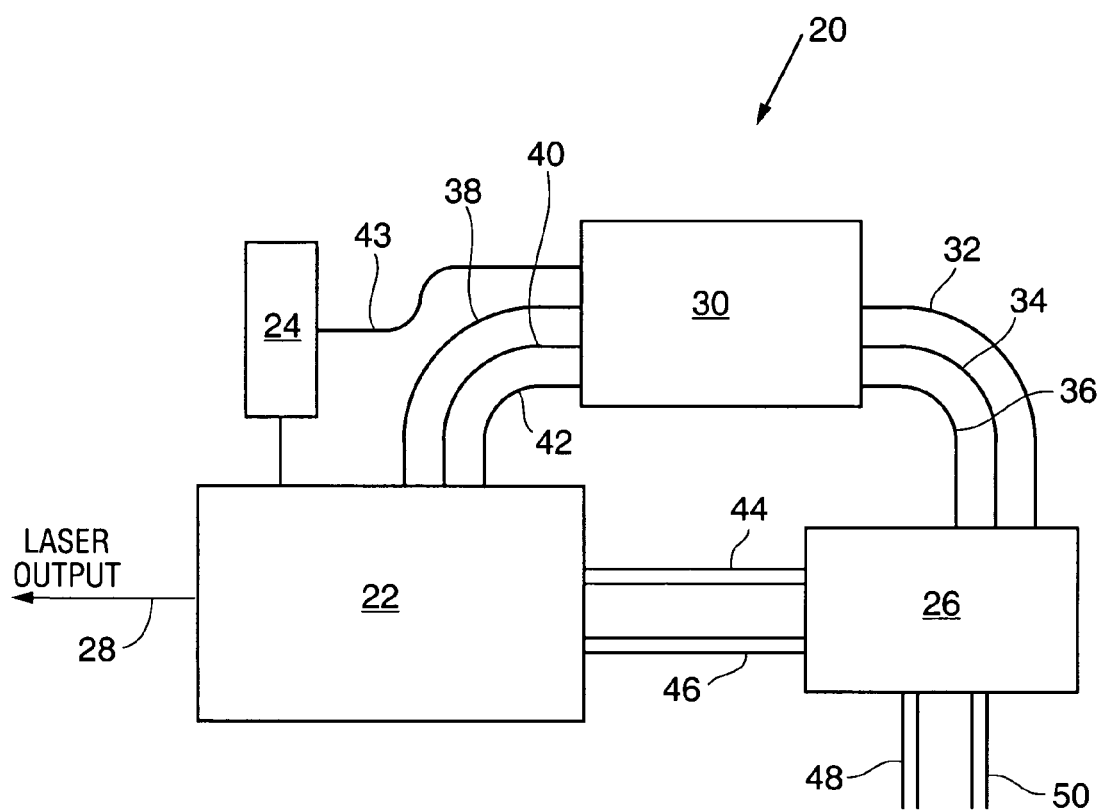
FIG. 1 schematically illustrates an ultrafast laser including an ultrafast laser resonator, a source of optical pump light, a controller, and a purging system in accordance with the present invention.

Referring now to FIG. 1, laser 20 includes a laser resonator 22, a source 24 of optical pump light, and a purging system 26 in accordance with the present invention. In this example, laser resonator 22 is an ultrafast laser resonator delivering laser radiation in the form of ultrafast output pulses 28. Laser 20 also includes a controller 30 arranged to control operations and parameters the laser resonator, the pump light source, and the purging system. Controller 30 controls operations of purging system 26 via electrical connections 32, 34, and 36. The controller controls operations and parameters of laser resonator 22 via electrical connections 38, 40, and 42, and controls pump light source 24 via electrical connection 43. Purging system 26 is cooperative with laser resonator 22 via conduits 44 and 46. Purging system 26 also includes conduits 48 and 50, which connect with a desiccant module (not shown in FIG. 1) in the purging system. The function of conduits 48 and 50 is described in detail further to hereinbelow.

Figure 2:
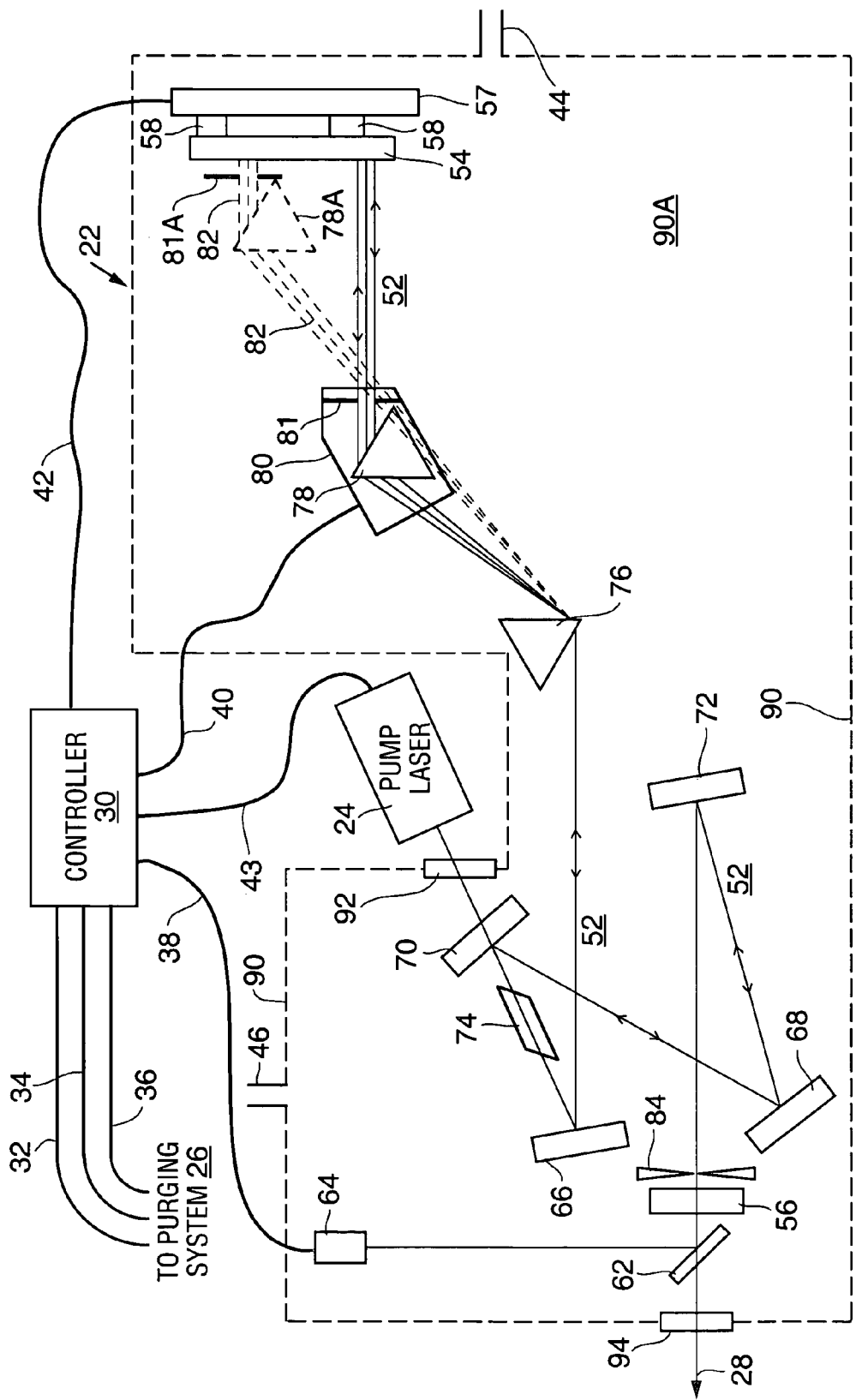
FIG. 2 schematically illustrates details of the laser resonator of FIG. 1, the laser resonator being located in an enclosure cooperative with the purging system of FIG. 1.

Referring now to FIG. 2, laser resonator 22 includes a resonant cavity 52 terminated by mirrors 54 and 56. Mirror 54 is a maximum reflecting mirror. The inclination of mirror 54 can be adjusted by controller 30 via electrical connection 42 and a mirror mount 57 including actuators 58. Mirror 56 is a partially transmitting mirror, which allows output pulses 28 to be delivered from the resonant cavity. A portion of the output pulses is sampled by a beamsplitter 62 and detected by a detector 64. Output of detector 64 is connected to controller 30 by connection 38 for use by the controller in controlling parameters of the laser resonator. The optical path of resonant cavity 54 is folded by fold mirrors 66, 68, 70, and 72. Folding of the optical path reduces the physical length of the resonant cavity.

Resonant cavity 54 includes a gain medium 74 located between mirrors 66 and 70. In this example the gain medium is Ti:sapphire, which provides optical gain in a wavelength region between about 700 and 1000 nanometers (nm). Pump light source 24, in this example, is a frequency-doubled Nd:YVO$_4$ laser, delivering pump light by fold mirrors a wavelength of 532 nm. Pump light from source 24 is delivered to gain medium 74 through mirror 70. Also located in resonant cavity 52 are two prisms 76 and 78. The prisms are arranged to compensate for group delay dispersion of laser radiation circulating in resonant cavity 52, and are also used to tune the output wavelength of the laser resonator.

Prism 78 is mounted on a movable carrier 80, the movement of which is controlled by controller 30 via electrical connection 40. A slit 81 defines a portion of prism 78 through which optical radiation can pass. The output wavelength of pulses 28 is changed or tuned by operating carrier 80 such that prism 78 is moved to a new location, indicated in FIG. 2 by dotted triangle 78A. Slit 81 is moved synchronously with the prism as indicated by line 81A. Dotted lines 82 indicate a change in optical path in the resonator resulting from the movement of prism 78. Laser resonator 22, in this example, is a mode locked laser resonator. Mode locking of the laser resonator is effected by an aperture 84 located in resonant cavity 52 and cooperative with a Kerr-lens effect induced in gain medium 74 by pump light delivered from pump-light source (laser) 24.

A detailed explanation of operating principles of resonant cavity 52 is not required for understanding principles of the present invention. Accordingly, such an explanation is not presented herein. A detailed explanation of an ultrafast laser including a resonant cavity similar to resonant cavity 52 is provided in co-pending application Ser. No. 09/813,507 the complete disclosure of which is hereby incorporated by reference.

Continuing now with reference to FIG. 2, optical components of laser resonator 22 are located in an enclosure indicated in FIG. 2 by dotted line 90. Pump light from laser 24 enters enclosure 90 via a window 92. Laser output pulses 28 leave the enclosure via a window 94. Other general construction principles of an enclosure such as enclosure 90 are well known to those skilled in the art to which the present invention pertains. Accordingly, such principles are not described or depicted herein. A feature of enclosure 90 specific to the present invention, however, is the connection of the enclosure to conduits 44 and 46, which provide fluid communication between the enclosure and components of purging system 26.

The interior (atmosphere) 90A of enclosure 90 is maintained at about ambient atmospheric pressure. The atmosphere of enclosure 90 will usually be an air atmosphere. If enclosure 90 is sufficiently well sealed, however, an atmosphere of nitrogen or some other inert gas may be included. Whatever the gaseous atmosphere of enclosure 90, it can be expected to include some finite level of contaminants, however small that level. As discussed above, these contaminants may include water vapor, organic vapors, and particulate matter. As noted above, particulate matter may include that which was present at the time that the enclosure was closed, and particulate matter generated as a result of interaction between laser radiation circulating in resonant cavity 52 and the organic vapors.

Figure 3:
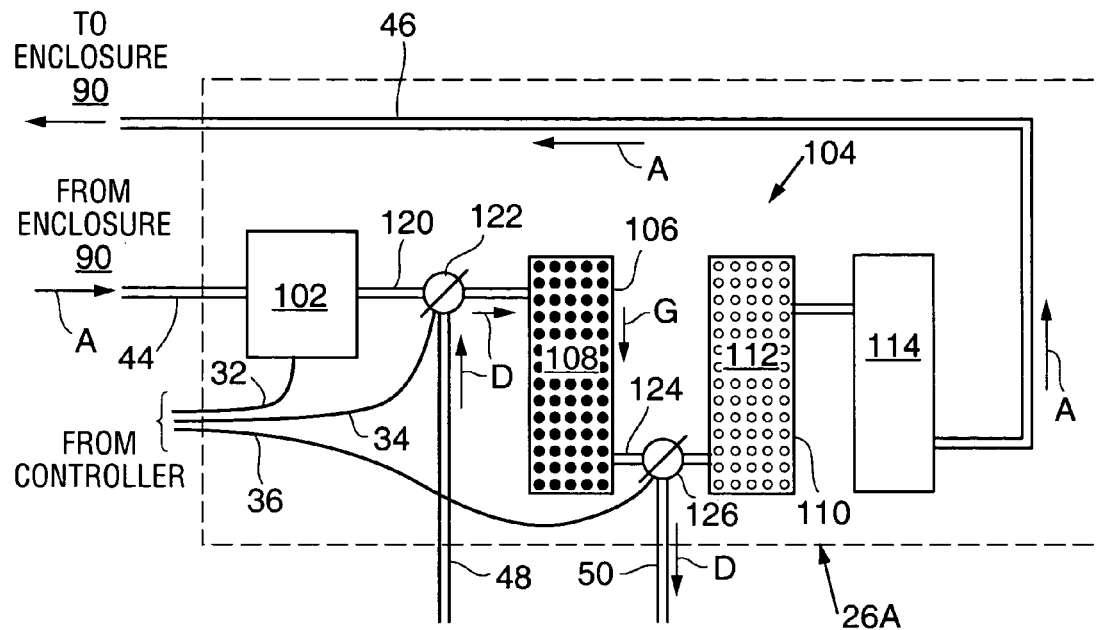
FIG. 3 schematically illustrates one preferred embodiment of the purging system of FIG. 1.

Referring now to FIG. 3, one preferred embodiment 26A of a purging system 26 in accordance with the present invention includes a pump 102 and a gas conditioning arrangement 104. Gas conditioning arrangement 104 includes a container 106 containing a desiccant material 108. Desiccant material 108 is preferably silica gel, but maybe any desiccant material. Gas conditioning arrangement 104 also includes a container 110 including an organic vapor trapping material 112. A preferred organic vapor trapping material is a high surface-area coconut-shell based activated carbon. Organic vapor traps including this material are available in various sizes from Agilent Technologies, Inc. of Palo Alto, Calif. Other suitable organic vapor trapping materials include a 5 Å molecular sieve.

A filter unit 114 is provided for filtering particulate matter. Filter unit 114 is preferably capable of trapping particles having a size of about 0.5 micrometers (μm) and greater, for example, a HEPA filter. One suitable HEPA filter is available from the Pall Gellman Sciences Inc. of Ann Arbor, Mich. as HEPA Capsule Part No. 12144. This filter has a pore size of 0.3 μm and has a filtering efficiency of 99.97% for 0.3 μm DOP aerosol.

Pump 102 extracts gas from the atmosphere of enclosure 90 via conduit 44. The pump delivers the extracted gas via a conduit 120 and a two-way valve 122 to gas conditioning arrangement 104. The circulation direction of gas through the purging system is indicated in FIG. 3 by arrows A. The gas delivered by pump 102 is urged by the pump through the desiccant material (medium) 108; through a conduit 124; through another two-way valve 126; and then through organic vapor trapping material 112. After passing through the organic vapor trapping material, the gas passes through HEPA filter 114 into conduit 46, which returns the gas to enclosure 90. As noted above, desiccant material 118 reduces the water vapor content of the gas, and organic vapor trapping material 112 reduces the organic vapor content of the gas. HEPA filter 114 reduces the particulate matter content of the gas. Valves 122 and 126 in this mode of operation prevent any of the extracted gas from escaping the purging system via conduits 48 and 50.

In one preferred cycle of operation of purging system 26A, the extraction and return of gas from and to the enclosure takes place continually during any period in which laser 20 is operating. Operation of the purging system is started and stopped by correspondingly starting or stopping pump 102 by commands delivered thereto from controller 30 via electrical connection 32. Continuous operation of purging system 26A can provide that in the atmosphere of enclosure 90, the water vapor, organic vapor, and particulate matter content of the atmosphere are maintained at minimum consistent with the materials and configuration of gas conditioning arrangement 104. It is possible, of course, that the inventive purging system could be activated and deactivated by controller 30 based on measurements of particle count or concentrations of particular vapor species. This, however, would require providing corresponding sensors, which could increase the cost of a laser or the purging system.

After a period of operation, depending on the ambient atmosphere in which laser 20 is located, or the conditions of operation of the laser, desiccant material 108 may become saturated with water vapor. Should this occur, desiccant material 108 may be revived or regenerated by passing a drying gas, such as dry air or dry nitrogen, through the material, as follows.

Operation of pump 102 is stopped. Valve 122 is switched to prevent air from being delivered from pump 102 to the desiccant material, and to allow the drying gas to be delivered to the desiccant material via conduit 48. Valve 126 is switched to prevent any drying gas from reaching enclosure 90 via the organic vapor trapping material, the HEPA filter, and conduit 46. This switching allows drying gas delivered to the desiccant material via conduit 48 to pass through the desiccant material and exit the purging system via conduit 50 as indicated in FIG. 3 by arrows D. After the desiccant material has been regenerated, valves 122 and 126 are switched back to a position that allows gas extracted from enclosure 90 to pass to the gas conditioning system and return to the enclosure via conduit 46. Valves 122 and 126 may be operated by commands delivered thereto along connections 34 and 36 from controller 30.

Figure 4:
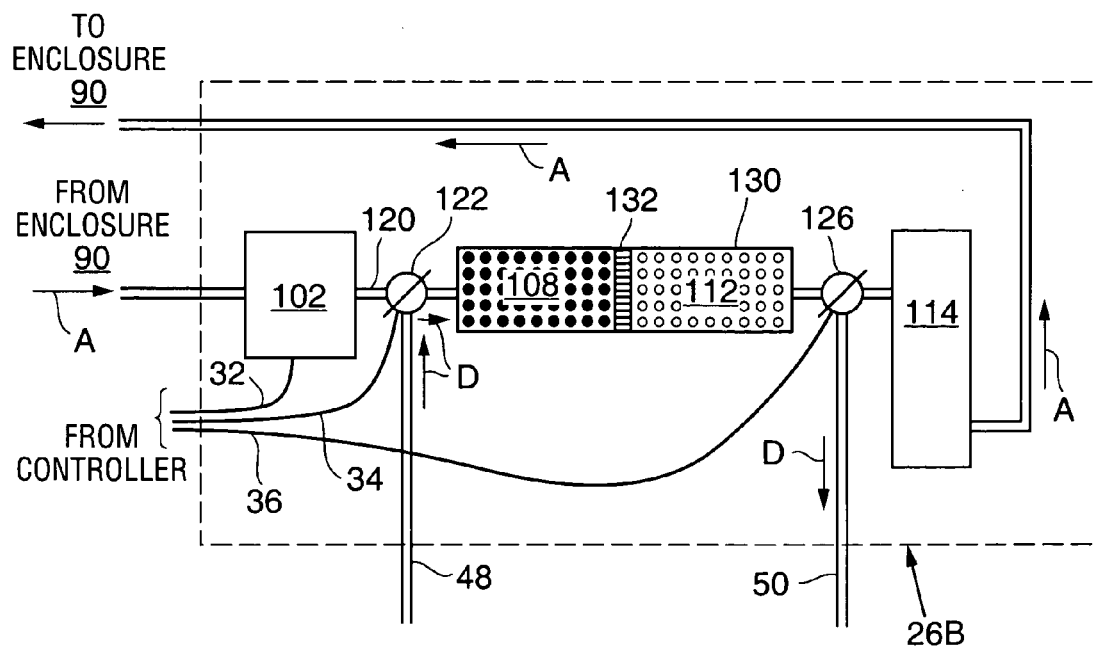
FIG. 4 schematically illustrates another preferred embodiment of the purging system of FIG. 1.

Another preferred embodiment 26B of a purging system in accordance with the present invention is depicted in FIG. 4. Purging system 26B is similar to purging system 26A of FIG. 3 with an exception that desiccant material 108 and organic vapor trapping material 112 are contained in a single container 130. A permeable diaphragm or separator 132 separates the desiccant material from the organic vapor trapping material. One such combined desiccant and organic vapor trapping unit is available from the W.A. Hammond Drierite Company Ltd of Xenia, Ohio as Part No. 27068.

It is emphasized here that the sequence of vapor reduction and filtering is particularly important in the method and apparatus of the present invention. If water vapor reduction does not precede organic vapor reduction there could be a significant degradation in the efficiency of organic vapor reduction. As there is a possibility that water vapor removal materials and organic vapor trapping materials can generate particulate matter it is important that particulate matter filtering takes place following water vapor reduction and organic vapor reduction.

In the description of laser 20 given above, laser resonator 22, controller 30, and purging system 26 are described as separate units. This arrangement should not be construed as limiting the present invention. By way of example, as the size of the purging system can be relatively small compared with the laser resonator, the purging system and the laser resonator may be combined in a single unit or housing. Alternatively, the purging system may be combined in a single housing with the controller. In another arrangement, purging system 26 may be configured as a stand-alone module including a dedicated controller separate from controller 30. One skilled in the art to which the present invention pertains may devise other configurations of the purging system, the laser resonator and one or more controllers without departing from the spirit and scope of the present invention.

The purging system of present invention is described above with reference to its use with a Ti:sapphire ultrafast laser. This should not be construed as limiting the present invention. The inventive purging system is applicable to other ultrafast lasers such as those including dyes or semiconductor materials as gain media. As noted above, the very high-power and short duration of ultrafast laser pulses can increase the possibility of the ultrafast laser radiation reacting with any organic contaminants that may be found in the atmosphere in the resonant cavity of the laser. Also as noted above, the inventive purging system is particularly useful in ultraviolet lasers where the high-energy of the ultraviolet radiation also increases the possibility of reactions with any organic contaminants in the laser resonator. Costs permitting, however, it may be found useful to use the inventive purging system with any other laser with the goal of extending the operating lifetime of optical components or reliability of operation of the laser.

The present invention is described above in terms of a preferred embodiment and other embodiments. The invention is not limited, however, to the embodiments described and depicted herein. Rather, the invention is limited only by the claims appended hereto.

What is claimed is:

1. A mode-locking laser system, comprising:
a sealed enclosure;
a solid state gain medium located in the sealed enclosure, the gain medium providing optical gain in a wavelength region between about 700 nm and about 1000 nm;
a pump source for optically pumping the solid state gain medium in order to produce optical radiation;
a plurality of optical components located in a gaseous atmosphere within said sealed enclosure and defining a resonant cavity for said optical radiation, said optical components capable of releasing water vapor into said gaseous atmosphere;
a gas conditioning arrangement including a desiccant medium;
a pump in fluid communication with said sealed enclosure via a first conduit and in fluid communication with said gas conditioning arrangement via a second conduit, said gas conditioning arrangement being in fluid communication with said enclosure via a third conduit;
said pump being arranged to extract gas from said enclosure via said first conduit and deliver said extracted gas to said gas-conditioning arrangement via said second conduit; and
said gas conditioning arrangement being configured such that said extracted gas delivered thereto by said pump passes through said desiccant medium and is then returned to said enclosure via said third conduit and operated in a manner intended to reduce water vapor from said gaseous atmosphere.

2. The mode-locking laser system of claim 1, wherein said desiccant medium is silica gel.

3. The mode-locking laser system of claim 1, further including fourth and fifth conduits and first and second valves, said fourth and fifth conduits and said valves arranged such that a drying gas can be passed through said desiccant medium for regenerating the desiccant medium while preventing said drying gas from entering said enclosure.

4. The mode-locking laser system of claim 1, wherein the plurality of optical components are further capable of releasing organic vapors into said gaseous atmosphere, whereby particulate matter is generated by interaction of said optical radiation with one or more of said water vapor and said organic vapors.

5. The mode-locking laser system of claim 4, wherein the gas conditioning arrangement further includes a medium for trapping organic vapors.

6. The mode-locking laser system of claim 5, wherein the gas conditioning arrangement further includes a filter for trapping particulate matter.

7. The mode-locking laser system of claim 6, wherein the gas conditioning arrangement is further configured such that said extracted gas delivered thereto by said pump passes, in sequence, through said desiccant medium, said organic vapor trapping medium, and said filter and is then returned to said enclosure via said third conduit and operated only in a manner intended to reduce water vapor, organic vapor and particulate matter from said gaseous atmosphere.

8. The mode-locking laser system of claim 5, wherein said organic vapor trapping medium is activated carbon.

9. The mode-locking laser system of claim 5, wherein said organic vapor trapping medium is a molecular sieve.

10. The mode-locking laser system of claim 6, wherein said filter is a HEPA filter.

11. A method of minimizing contamination of optical components of a laser, the components being located in an gaseous atmosphere within a sealed enclosure of the laser and defining a resonant cavity for optical radiation, the method comprising the steps of:
optically pumping a solid state gain medium in the sealed enclosure in order to produce optical radiation, the gain medium providing optical gain in a wavelength region between about 700 nm and about 1000 nm;
extracting gas from the gaseous atmosphere within the sealed enclosure;
passing the extracted gas through a desiccant medium selected to reduce a water vapor content thereof; and
returning the extracted gas to the sealed enclosure after reduction of the water vapor content.

12. The method of claim 11, wherein said desiccant medium is silica gel.

13. The method of claim 11, further including the step of passing a drying gas through said desiccant medium for regenerating the desiccant medium while preventing said drying gas from entering said sealed enclosure.

14. The method of claim 11, further including the step of passing the extracted gas through an organic vapor trapping medium selected to reduce the organic vapor content thereof, after passing the extracted gas through the desiccant medium.

15. The method of claim 14, further including the step of passing the extracted gas through a filter selected to reduce the particulate matter content thereof, after passing the extracted gas through the organic vapor trapping medium.

16. The method of claim 14, wherein said organic vapor trapping medium is activated carbon.

17. The method of claim 14, wherein said organic vapor trapping medium is a molecular sieve.

18. The method of claim 15, wherein said filter is a HEPA filter.

* * * * *